United States Patent [19]
An

[11] Patent Number: 5,949,860
[45] Date of Patent: Sep. 7, 1999

[54] METHOD AND APPARATUS FOR RECEIVING FACSIMILE MESSAGE IN FACSIMILE CONNECTED TO EXTERNAL TELEPHONE

[75] Inventor: Chung-Mo An, Seoul, Rep. of Korea

[73] Assignee: SamSung Electronics Co., Ltd., Kyungki-do, Rep. of Korea

[21] Appl. No.: 09/021,533

[22] Filed: Feb. 10, 1998

[30] Foreign Application Priority Data

Feb. 10, 1997 [KR] Rep. of Korea ................... 1997-3879

[51] Int. Cl.[6] .................................................. H04M 11/00
[52] U.S. Cl. .............................. 379/100.15; 379/100.05; 379/100.06; 358/442
[58] Field of Search ......................... 379/100.05, 100.06, 379/100.15, 100.16, 93.09, 93.11; 358/434–442, 468

[56] References Cited

U.S. PATENT DOCUMENTS

| | | |
|---|---|---|
| 4,639,553 | 1/1987 | Kiguchi . |
| 4,813,067 | 3/1989 | Hashimoto . |
| 4,908,851 | 3/1990 | Kotani et al. . |
| 4,916,732 | 4/1990 | Kotani et al. . |
| 5,027,385 | 6/1991 | Nakagawa et al. . |
| 5,029,202 | 7/1991 | Doernbach, Jr. et al. . |
| 5,056,132 | 10/1991 | Coleman et al. . |
| 5,113,432 | 5/1992 | Van Santbrink et al. . |
| 5,146,489 | 9/1992 | Telibasa . |
| 5,200,991 | 4/1993 | Motoyanagi . |
| 5,311,587 | 5/1994 | Ohta et al. . |
| 5,337,350 | 8/1994 | Kuwahara . |
| 5,416,834 | 5/1995 | Bales et al. . |
| 5,428,673 | 6/1995 | Nakagawa et al. . |
| 5,440,619 | 8/1995 | Cann . |
| 5,487,105 | 1/1996 | Sakai . |
| 5,506,891 | 4/1996 | Brown ................................. 379/100.06 |
| 5,517,556 | 5/1996 | Pounds . |
| 5,699,414 | 12/1997 | Telibasa . |
| 5,703,699 | 12/1997 | Kim . |
| 5,815,285 | 9/1998 | Monty et al. ....................... 379/100.16 |

*Primary Examiner*—Wing F. Chan
*Attorney, Agent, or Firm*—Robert E. Bushnell, Esq.

[57] ABSTRACT

A facsimile receives a facsimile message even if an external telephone connected to the facsimile assumes a line-off status. The facsimile checks a calling tone transmitted from the calling facsimile while the external telephone is in a line-on status. It is determined whether the external telephone assumes a line-off status before the calling tone is completely checked. If the external telephone assumes the line-off status before the calling tone is completely checked, the facsimile displays a message advising of reception of a facsimile call, and receives the facsimile message transmitted from the calling facsimile if a user accepts reception of the facsimile message.

17 Claims, 4 Drawing Sheets

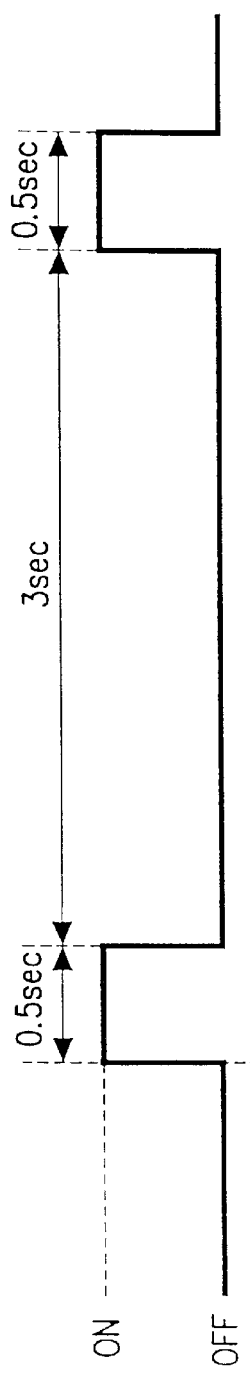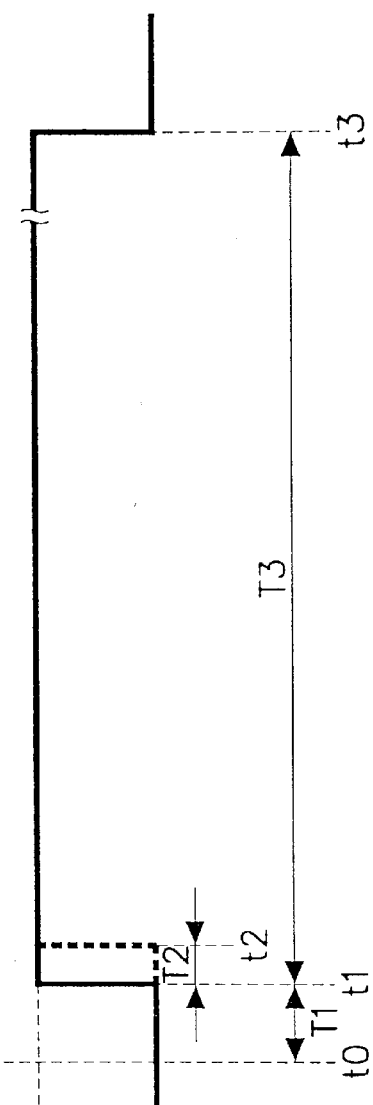
FIG. 5(a)
FIG. 5(b)
FIG. 5(c)

METHOD AND APPARATUS FOR RECEIVING FACSIMILE MESSAGE IN FACSIMILE CONNECTED TO EXTERNAL TELEPHONE

CLAIM OF PRIORITY

This application makes reference to, incorporates the same herein, and claims all benefits accruing under 35 U.S.C. §119 from an application entitled *Method And Apparatus For Receiving Facsimile Message In Facsimile Connected To External Telephone* earlier filed in the Korean Industrial Property Office on Feb. 10, 1997, and there duly assigned Serial No. 97-3879 by that Office.

BACKGROUND OF THE INVENTION

1. Technical Field

The present invention relates to a facsimile, and in particular, to a method and apparatus for receiving a facsimile message from a calling facsimile in a facsimile connected to an external telephone.

2. Related Art

Communication between facsimiles for transmitting a facsimile message is attained by performing a protocol according to a predetermined transmission control procedure. The term "facsimile message" refers to an original document on which picture or text is formed. In the facsimile, the transmission control procedure conforms to a recommendation specified in "Terminal Equipment and Protocols for Telematic Services Recommendations T.30 (Blue Book)", ITU (International Telecommunication Union) CCITT (International Telegraph and Telephone Consultative Committee) Volume VII-Fascicle VII.3. In accordance with the transmission control procedure specified in the recommendation, when setting up a call between a calling facsimile and a called facsimile, the calling facsimile transmits a calling tone (CNG) to the called facsimile. Upon checking such a calling tone received from the calling facsimile, the called facsimile transmits a CED (called station identification) signal to the calling facsimile, thereby to set up the call. The calling tone check is attained when the called facsimile has detected two calling tones. After completion of such a call set up, the actual facsimile message is transmitted between the calling and called facsimiles.

Although a facsimile may have a handset therein, the facsimile may be connected to an external telephone so as to allow a user to make a telephone call or receive an incoming call, even in case of a power failure. The external telephone may include a telephone answering machine (TAD).

However, in a facsimile connected to an external telephone, upon hearing a ring tone transmitted by a calling facsimile so as to transmit a facsimile message, a user of the called facsimile may pick up the handset of the external telephone, thereby connecting the telephone line (i.e., a line-on status). Then, the calling facsimile transmits the calling tone to the called facsimile. Upon hearing the calling tone, the user may leave the handset off, thereby disconnecting the telephone line (i.e., a line-off status) before the called facsimile completely checks the calling tone transmitted from the calling facsimile. Accordingly, the called facsimile cannot receive the facsimile message.

As described above, if the external telephone assumes a line-off status before the called facsimile completely checks the calling tone transmitted from the calling facsimile, the facsimile cannot receive the facsimile message due to disconnection of the telephone line.

The following patents are considered to be representative of the prior art relative to the invention disclosed herein: U.S. Pat. No. 5,703,699 to Kim entitled a *Method for Automatically Receiving Image Data in Facsimile System Regardless of Whether Such Facsimile System Is Operating in Private Line Mode or Public Line Mode*, U.S. Pat. No. 5,699,414 to Telibasa entitled a *Method and Apparatus for Sharing a Single Telephone Line Between a Facsimile Machine, Data Modem, Telephone Answering Device, and a Person*, U.S. Pat. No. 5,517,556 to Pounds et al. entitled a *Call Processing System with Facsimile Processing*, U.S. Pat. No. 5,487,105 to Sakai entitled a *Facsimile Apparatus Operable in Facsimile or Telephone Mode*, U.S. Pat. No. 5,440,619 to Cann entitled a voice, *Data and Facsimile Modem with Modified Ringback Answering*, U.S. Pat. No. 5,428,673 to Nakagawa et al. entitled a *Data Communication Apparatus Having the Function of Automatically Switching Communication and Telephone Communication*, U.S. Pat. No. 5,416,834 to Bales et al. entitled a *Redirection of Calls by a Communication Terminal*, U.S. Pat. No. 5,337,350 to Kuwahara entitled a *Facsimile Apparatus with Telephone System*, U.S. Pat. No. 5,331,587 to Ohta et al entitled a *Sensor Circuit for Telephone Line*, U.S. Pat. No. 5,200,991 to Motoyanagi entitled an *Image Communication System Including a Mobile Telephone Set and a Facsimile Device*, U.S. Pat. No. 5,146,489 to Telibasa entitled a *Dedicated Line Eliminator for Facsimile/telephone Systems*, U.S. Pat. No. 5,113,432 to Van Santbrink et al. entitled an *Arrangement for Connecting a Telefax Device or a Telephone Set to a Telecommunication Line*, U.S. Pat. No. 5,056,132 to Coleman et al entitled a *Switching Device Adapted to Interface Between an Incoming Telephone Line and an Internal Telephone System*, U.S. Pat. No. 5,029,202 to Doembach, Jr. et al. entitled an *Incoming Telephone Call Director*, U.S. Pat. No. 5,027,385 to Nakagawa et al. entitled a *Facsimile Apparatus for Communicating on External and Internal Telephone Sets*, U.S. Pat. No. 4,916,732 to Kotani et al. entitled a *Communication System Having Telephonic Function*, U.S. Pat. No. 4,908,851 to Kotani et al. entitled a *Facsimile Apparatus Operable in Facsimile or Conversation Mode*, U.S. Pat. No. 4,813,067 to Hashimoto entitled an apparatus for connecting selectively a *Telephone Answering Device or Additional Equipment, Such as a Facsimile Machine, to Telephone Lines,* and U.S. Pat. No. 4,639,553 to Kiguchi entitled a *Call Signal Detecting Device*.

SUMMARY OF THE INVENTION

It is, therefore an object of the present invention to provide a method and apparatus for receiving a facsimile message, even if an external telephone connected to the facsimile assumes a line-off status.

According to an aspect of the present invention, a method and apparatus for receiving a facsimile message transmitted from a calling facsimile in a facsimile connected to an external telephone include the steps and functions of: checking a calling tone transmitted from the calling facsimile while the external telephone is in a line-on status; checking whether the external telephone assumes a line-off status before the calling tone is completely checked; displaying a message informing reception of a facsimile call if the external telephone assumes the line-off status before the calling tone is completely checked; and receiving the facsimile message transmitted from the calling facsimile, if a user accepts reception of the facsimile message from the calling facsimile.

BRIEF DESCRIPTION OF THE DRAWINGS

The above and other objects, features and advantages of the present invention will become more apparent in the light of the following detailed description of an exemplary embodiment thereof taken with the attached drawings in which:

FIGS. 5(a)–5(c) are operational timing diagrams according to the present invention.

DETAILED DESCRIPTION OF THE PREFERRED EMBODIMENT

A preferred embodiment of the present invention will be described in detail referring to the attached drawings. Though the specific embodiment such as the detailed flow chart will be exemplarily defined and described in detail to clarify the subject matter of the present invention, the present invention may be implemented with the description of the present invention by those skilled in the art even without the details. In addition, an unnecessary detailed description of widely known functions and constructions may be avoided here.

Figure 1:
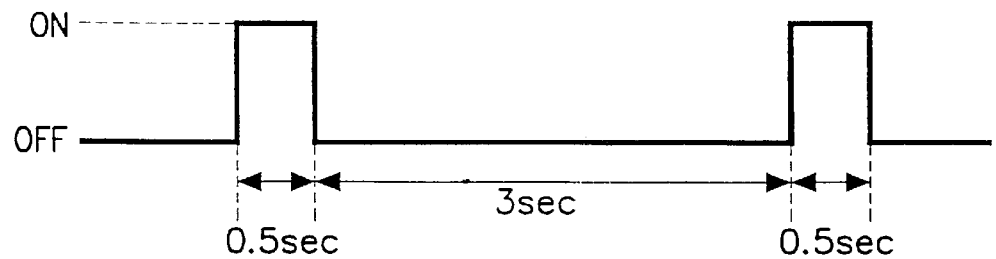
FIG. 1 is a format of a calling tone.

FIG. 1 shows the format of the calling tone (CNG) specified in the recommendation specified in "Terminal Equipment and Protocols for Telematic Service Recommendation T.30 (Blue Book)", which calling tone has a frequency of 1100 Hz, and the format of the calling tone is as shown in FIG. 1. As shown in the drawing, the calling tone has a cadence of 0.5 sec-on/3 sec-off. That is, the frequency of 1100 Hz is activated for the first 0.5 seconds and inactivated for the following 3 seconds, repeatedly.

Figure 2:
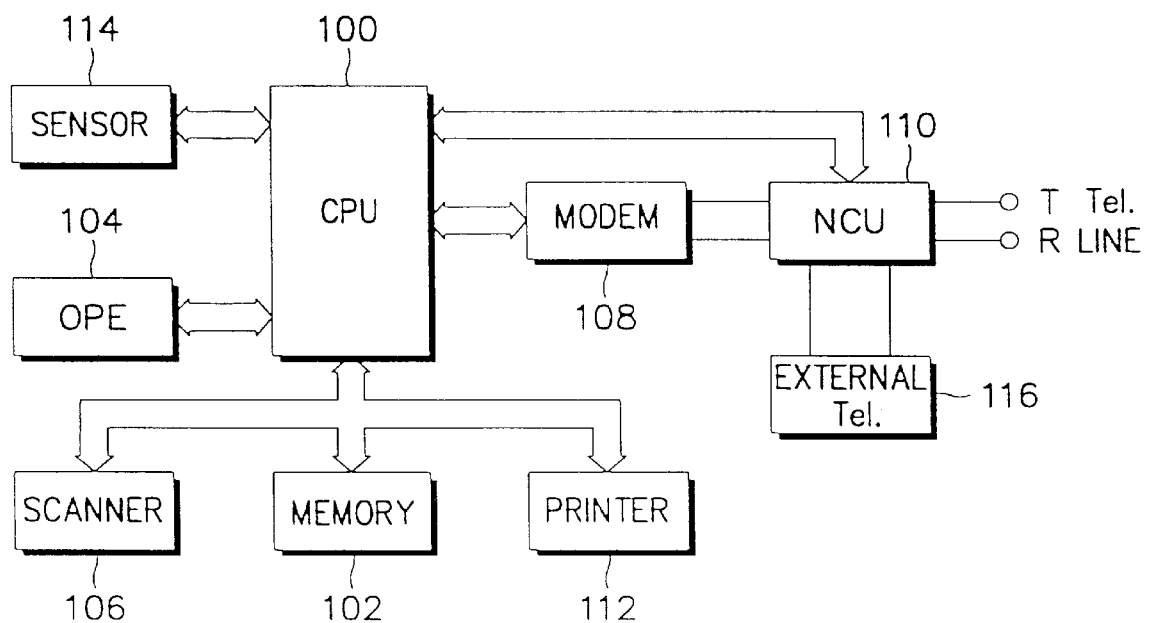
FIG. 2 is a schematic block diagram of a facsimile connected to an external telephone, to which the present invention is applicable.

FIG. 2 illustrates a facsimile connected to an external telephone 116, to which the present invention is applicable. With reference to FIG. 2, a CPU (central processing unit) 100 controls each part of the facsimile according to a control program stored in a memory 102. The memory 102 includes a ROM (read only memory) for storing the control program of the CPU 100, a protocol control program and various reference data, and a RAM (random access memory) for temporarily storing data generated during an execution of the control program for the CPU 100. An operating panel equipment (OPE) 104 includes a number of numeric keys, function keys and a display to provide the CPU 100 with key data generated according to a key depression by a user, and to display various operating status of the facsimile under the control of the CPU 100. A scanner 106 scans a facsimile message to generates image data of the facsimile message. The image data generated from the scanner 106 is processed by the CPU 100 and stored into the memory 102. The image data stored in the memory 102 may be transmitted by a modem (modulator-demodulator) 108 or printed by a printer 112. The modem 108 modulates the image data and data output from the CPU 100 into an analog signal to transmit the analog modulation signal to a counterpart facsimile via a network control unit (NCU) 110 and telephone lines T and R. Further, the modem 108 demodulates the analog signal received from the telephone lines T and R. The network control unit 110 connects the telephone lines T and R to the modem 108 and the external telephone 116 under the control of the CPU 100. The printer 112 prints the facsimile image under the control of the CPU 100. A sensor 114 senses, for example, a residual quantity of recording paper and reception of the facsimile message, and provides the CPU 100 with a sensing signal. The external telephone 116 is connected to the facsimile via the network control unit 110.

Figure 3:
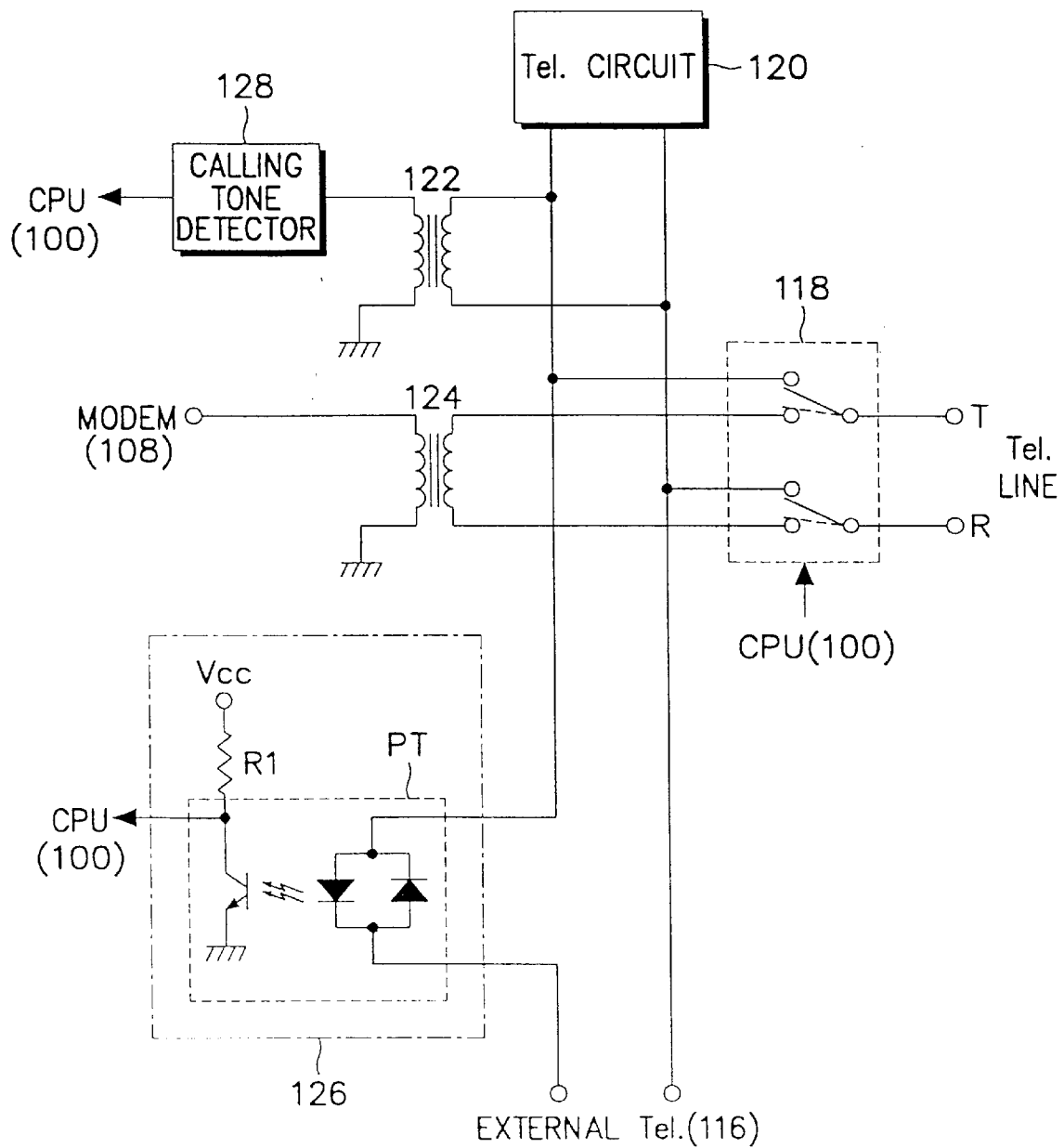
FIG. 3 is a detailed block diagram of the network control unit of FIG. 2.

FIG. 3 illustrates a detailed block diagram of the network control unit 110 of FIG. 2. In the drawing, a relay 118 switches the telephone lines T and R to the facsimile (specifically, a transformer 124) or the external telephone 116 under the control of the CPU 100. A transformer 122 is connected to a calling tone detector 128, and the transformer 124 is connected to the modem 108. A telephone circuit 120 connected to the CPU 100 and to a handset (not shown) performs a known call processing function. The calling tone detector 128 detects the calling tone shown in FIG. 1, and informs the CPU 100 of the detection of the calling tone. A line detection circuit 126 connected between the relay 118 and the external telephone 116 includes a photocoupler PT and a resistor R1, and detects a line-on or line-off status of the external telephone 116 to inform the CPU 100 of the detection of the line-on or line-off status. On a condition that the relay 118 is switched to the external telephone 116, if the external telephone 116 assumes the line-on status, a current loop is formed between the external telephone 116 and the telephone lines T and R. Then, the photocoupler PT is turned on and a "low" signal output is transferred to the CPU 100. In this condition, if the external telephone 116 assumes the line-off status, the current loop between the external telephone 116 and the telephone lines T and R is cut off. As the result, the photocoupler PT is turned off and a "high" signal output is transferred to the CPU 100. The CPU 100 of the facsimile checks the calling tone and detects the line-on or line-off status of the external telephone 116 by means of the above described network control unit 110.

Figure 4:
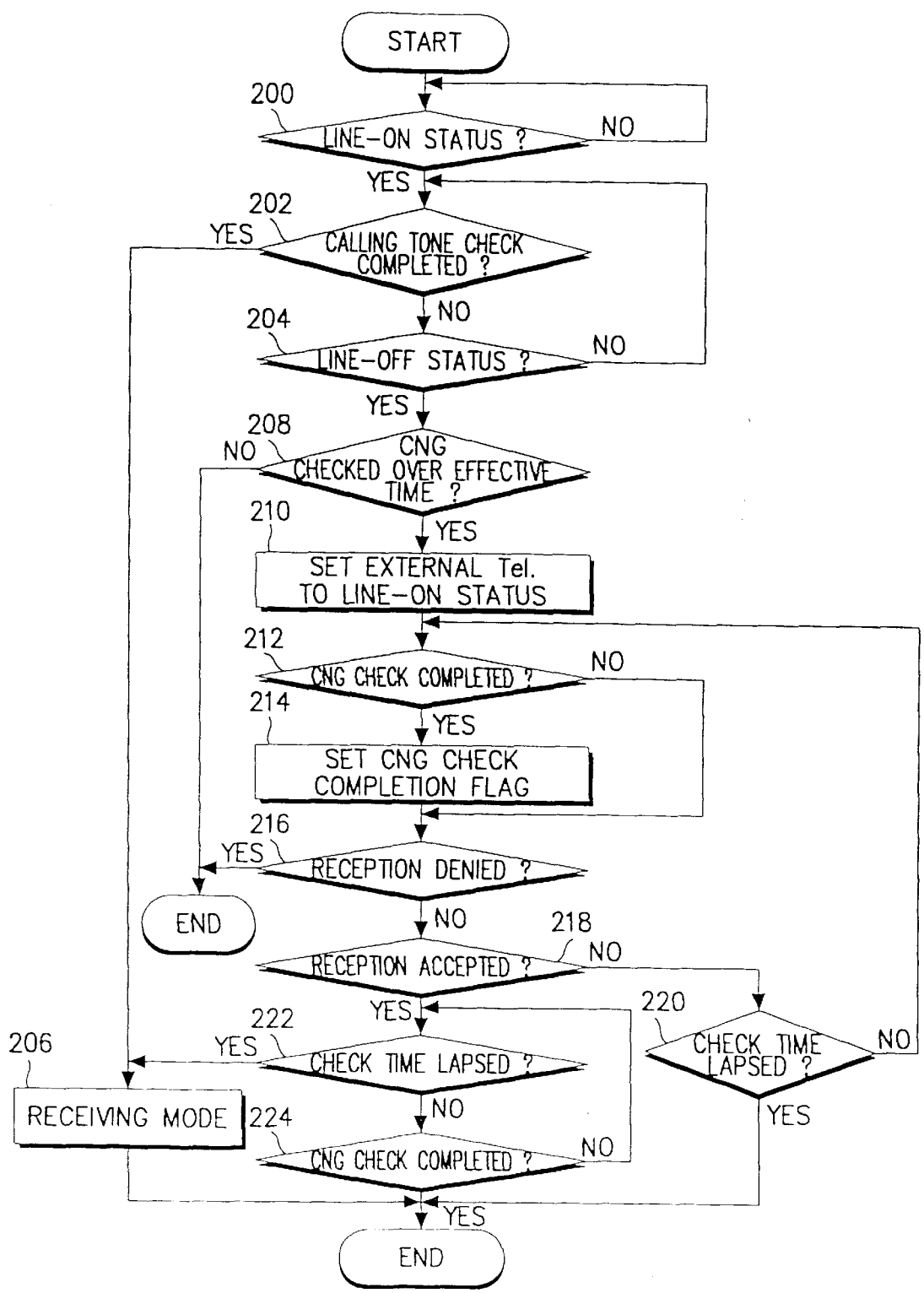
FIG. 4 is a flow chart for receiving a facsimile message according to a preferred embodiment of the present invention.

FIG. 4 shows a control process of the CPU 100 for receiving a facsimile message even if the external telephone 116 assumes the line-off status while the facsimile checks the calling tone. The control process is programmed into the memory 102.

FIGS. 5(a)–5(c) show operational timing diagrams of the facsimile according to the present invention. FIG. 5(a) expresses the calling tone shown in FIG. 1. FIG. 5(b) demonstrates that the external telephone 116 changes from the line-on status to the line-off status at time t1, after a lapse of time T1 from a time t0. FIG. 5(c) demonstrates that the external telephone again assumes the line-on status by means of the relay 118 prior to a time t2, after a lapse of time T2 from the line-off time Now, referring to FIGS. 2 to 5(a)–(c), the preferred embodiment of the present invention will be described in detail. In the following description, it will be considered that the facsimile shown in FIG. 2 is a called facsimile. If the external telephone 116 assumes the line-on status as a result of action by the user while a calling facsimile calls the called facsimile to transmit a facsimile message, the calling facsimile transmits the calling tone to the called facsimile. Then, the CPU 100 determines at step 200 whether or not the external telephone 116 is still in the line-on status by means of the line detection circuit 126. If the external telephone 116 is in the line-on status, the CPU 100 determines at step 202 whether or not the calling tone detector 128 has completely checked the calling tone. If the calling tone detector 128 has completely checked the calling tone while the external telephone 116 maintains the line-on status, the CPU 100 will perform a normal receiving mode at step 206 so as to automatically receive the facsimile message from the calling facsimile.

However, if the external telephone 116 has changed to the line-off status prior to completion of the calling tone check, the CPU 100 detects the line-off status at step 204 by means of the line detection circuit 126. At step 208, the CPU 100 determines whether the calling tone is checked over a predetermined effective time T1 of FIG. 5. The effective time T1 expresses a reference time for determining whether or not the calling tone checked up to the present is effective. Since an on-time of the calling tone is commonly 500 msec, the effective time should preferably be set between 300 msec and 490 msec. As the result of step 208, if the time checked up to the present does not exceed the effective time T1, the CPU 100 considers the calling tone ineffective and completes the procedure.

On the contrary, if the calling tone is checked over the effective time T1, the CPU 100 turns on the relay 118 at step 210 so as to allow the external telephone 116 to assume the line-on status again, displays on the OPE 104 a message inquiring as to whether or not to receive the facsimile message, and sets a check time T3 of FIG. 5 to 10 sec. In this case, if a time interval between the line-off time point t1 and the line-on time point t2 is longer than a predetermined time, a telephone exchange system (not shown) connected to the telephone lines T and R will recognize that the external telephone 116 is in the line-off status, and will disconnect the telephone lines T and R. Therefore, it is necessary to allow the external telephone 116 to change to the line-on status prior to disconnection of the telephone lines T and R. In general, where the telephone lines T and R change from the line-on status to the line-off status, the telephone switching system recognizes the line-off status after a lapse of a predetermined time. Therefore, in light of this feature of the telephone switching system, if the telephone lines T and R assume the line-on status prior to the time point t2, after a lapse of the predetermined time T2 from the line-off time point t1, it is possible to maintain the line-on status even though the external telephone 116 assumes the line-off status. Therefore, it is preferable to set the predetermined time T2 to a value below 10 msec (for example).

The message inquiring as to whether to receive the facsimile message may be, for example: "A facsimile signal is recognized. Do you want to receive the facsimile message?". Upon seeing such an inquiry message displayed on the OPE 104, the user may notice that there has been a facsimile call even though he has had the external telephone 116 assume the line-off status. If the user accepts reception of the facsimile message, the called facsimile receives the facsimile message in the normal receiving mode. However, if the user denies reception of the facsimile message, the procedure will be completed. Acceptance or denial of reception of the facsimile message maybe determined by user depression of a "YES" or "NO" key on the OPE 104.

Further, the check time T3 is to prevent the continuous checks of the calling tone, and is set to 11 sec, since the calling tone check is completed when the on-time of the calling tone is continuously detected two times. Then, if the calling tone check is not completed until the check time T3 is exceeded, the procedure will be completed. Here, the check time T3 of FIG. 5 expresses a minimum time for completing the calling tone check.

Accordingly, even where the external telephone 116 assumes the line-off status as a result of action by the user while the called facsimile is checking the calling tone received from the calling facsimile, the facsimile according to the present invention can maintain the line-on status and notify the user that there is a facsimile call so as to allow the user to choose to receive or not the facsimile message. Thereafter, the calling tone check is continued by the calling tone detector 128.

At steps 212 to 224, if the user decides to receive the facsimile message, the CPU 100 goes to step 206 after completion of the calling tone check so as to receive the facsimile message in the usual manner. On the contrary, if the user does not desire to receive the facsimile message, the procedure is completed. Specifically, at steps 212 to 220, the CPU 10 checks for completion of the calling tone check and determines whether or not the user desires to receive the facsimile message until the check time T3 has lapsed. In the interim, if the calling tone check is completed, a calling tone check completion flag is set. Further, if the reception of the facsimile message is denied by the user before the check time T3 has lapsed, the CPU 100 completes the procedure.

On the contrary, if the reception of the facsimile message is accepted by the user before the check time T3 has lapsed, the CPU 100 checks again at steps 222 and 224 as to whether or not the calling tone check is completed. If the calling tone check is completed before the check time T3 has lapsed, the CPU 100 goes to step 206 to receive the facsimile message from the calling facsimile in the normal manner. However, if the calling tone check is not completed until the check time T3 has lapsed, the CPU 100 completes the procedure.

Accordingly, the facsimile according to the present invention can maintain the line-on status so as to receive the facsimile message from the calling facsimile even though the external telephone 116 assumes the line-off status while the called facsimile checks the calling tone received from the calling facsimile.

As can be appreciated from the foregoing descriptions, even though the external telephone assumes the line-off status before the called facsimile completes the calling tone check, the called facsimile according to the present invention can receive the facsimile message from the calling facsimile.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims. For example, the disclosed procedure for inquiring the user to choose whether to accept or deny reception of the facsimile message may be eliminated at the discretion.

What is claimed is:

1. A method for receiving a facsimile message transmitted from a calling facsimile in a receiving facsimile connected to an external telephone, said method comprising the steps of:

detecting a calling tone transmitted from said calling facsimile while said external telephone is in a line-on status;

determining whether said external telephone assumes a line-off status before said calling tone is completely checked;

displaying a message informing a user of reception of a facsimile call when said external telephone assumes the line-off status before said calling tone is completely detected; and receiving the facsimile message transmitted from said calling facsimile.

2. A method for receiving a facsimile message according to claim 1, further comprising the steps of:

determining whether said calling tone is detected over a predetermined effective time; and displaying a message requesting the user to decide whether to accept or deny reception of said facsimile message when said calling tone is detected over said predetermined effective time; and wherein the receiving step comprises receiving said facsimile message if the user decides to accept the reception.

3. A method for receiving a facsimile message according to claim 2, further comprising the step of disconnecting a telephone line when said calling tone is not completely detected until a predetermined check time has lapsed.

4. A method for receiving a facsimile message according to claim 3, further comprising the step of allowing said facsimile to again assume the line-on status within a predetermined time interval after the line-off status.

5. A method for receiving a facsimile message according to claim 4, wherein said predetermined time interval is approximately ten milliseconds.

6. A method for receiving a facsimile message according to claim 3, wherein said predetermined check time is approximately ten milliseconds.

7. A method for receiving a facsimile message according to claim 2, wherein said predetermined effective time is between approximately three hundred milliseconds and approximately four hundred ninety milliseconds.

8. An apparatus for receiving a facsimile message transmitted from calling facsimile in a receiving facsimile connected to an external telephone, said apparatus comprising:

detecting means for detecting a calling tone transmitted from said calling facsimile while said external telephone is in a line-on status;

determining means for determining whether said external telephone assumes a line-off status before said calling tone is completely checked;

display means for displaying a message informing a user of reception of a facsimile call when said external telephone assumes the line-off status before said calling tone is completely detected; and receiving means for receiving the facsimile message transmitted from said calling facsimile.

9. An apparatus according to claim 8, further comprising:

additional determining means for determining whether said calling tone is detected over a predetermined effective time; and said display means displaying a message requesting the user to decide whether to accept or deny reception of said facsimile message when said calling tone is detected over said predetermined effective time; and said receiving means receives said facsimile message when the user decides to accept the reception.

10. An apparatus according to claim 9, further comprising disconnecting means for disconnecting a telephone line until a predetermined check time has lapsed if said calling tone is not completely detected.

11. An apparatus according to claim 10, further comprising means for allowing said facsimile to again assume the line-on status within a predetermined time interval after the line-off status.

12. An apparatus according to claim 11, wherein said predetermined time interval is approximately ten milliseconds.

13. An apparatus according to claim 10, wherein said predetermined check time is approximately ten milliseconds.

14. An apparatus according to claim 9, wherein said predetermined effective time is between approximately three hundred milliseconds and approximately four hundred ninety milliseconds.

15. A method for receiving a facsimile message transmitted from a calling facsimile and a receiving facsimile connected to an external telephone, comprising the steps of:

checking a line-on status of said external telephone;

when said external telephone is assuming said line-on status, checking whether a calling tone check is completed;

checking a line-off status of said external telephone;

checking whether a calling tone is detected over predetermined effective time; and when said line-on status of said external telephone is detected and said calling tone check is not completed prior to a line-off status of said external telephone, and if said calling tone is detected over said predetermined effective time, setting said external telephone to line-on status.

16. A method according to claim 15, further comprising the steps of said:

checking whether a calling tone is completed;

when said calling tone is completed, setting a calling tone check completion flag.

17. A method according to claim 16, further comprising the steps of:

checking for denial or acceptance of reception;

when reception is accepted, checking for lapse of said predetermined effective time;

when said predetermined time has lapsed, entering a receiving mode;

when said predetermined time has not lapsed, checking for completion of said calling tone; and when said calling tone check is not completed, returning to the step of checking for lapse of said predetermined effective time.

* * * * *